US010352677B2

(12) United States Patent
Stewart et al.

(10) Patent No.: US 10,352,677 B2
(45) Date of Patent: Jul. 16, 2019

(54) MEASUREMENT DEVICES AND METHODS

(71) Applicant: MJ Stewart Investments, LLC, Washington, UT (US)

(72) Inventors: Jeffrey D. Stewart, Washington, UT (US); Wayne A. Provost, St. George, UT (US)

(73) Assignee: MJ Stewart Investments, LLC, Washington, UT (US)

( * ) Notice: Subject to any disclaimer, the term of this patent is extended or adjusted under 35 U.S.C. 154(b) by 117 days.

(21) Appl. No.: 15/470,459

(22) Filed: Mar. 27, 2017

(65) Prior Publication Data

US 2017/0322006 A1    Nov. 9, 2017

Related U.S. Application Data

(63) Continuation-in-part of application No. 15/145,683, filed on May 3, 2016, now Pat. No. 9,903,696.
(Continued)

(51) Int. Cl.
*G01B 3/00* (2006.01)
*G01B 3/10* (2006.01)
*G01B 3/02* (2006.01)

(52) U.S. Cl.
CPC ........... *G01B 3/1082* (2013.01); *G01B 3/004* (2013.01); *G01B 3/1084* (2013.01); *G01B 3/02* (2013.01);
(Continued)

(58) Field of Classification Search
CPC .......... G01B 3/1082; G01B 2003/1058; G01B 2003/1046; G01B 2003/1074;
(Continued)

(56) References Cited

U.S. PATENT DOCUMENTS 2,140,714 A * 12/1938 Palmer ................ E04G 21/1808
235/85 R
2,928,181 A * 3/1960 Siemantel ................ G01B 3/40
33/199 R
(Continued)

FOREIGN PATENT DOCUMENTS

EP    2098818    9/2009

OTHER PUBLICATIONS

U.S. Appl. No. 15/145,683, filed Dec. 12, 2017.

*Primary Examiner* — Yaritza Guadalupe-McCall
(74) *Attorney, Agent, or Firm* — Workman Nydegger

(57) ABSTRACT

A measurement device includes first and second measurement indicia. First indicia (e.g., on the tape) may include numerals regularly spaced to mark inches or other units of length (e.g., 1, 2, 3, etc.). Also included are second indicia, that are non-numeric (e.g., letters, such as A, B, C, etc.) where the second indicia are regularly spaced to mark fractions of inches or other units of length indicated by the first indicia. The second indicia are positioned between adjacent first indicia. For example, the letters (A, B, C, etc.) may be spaced every sixteenth or other fraction of an inch between the "1" and "2" (adjacent first indicia). Where sixteenths are used, the letters A-O are equally spaced, between the adjacent first indicia (e.g., between the "1" and the "2"). The A-O may repeat between each integral number—between "1" and "2", between "2" and "3" and so forth.

20 Claims, 11 Drawing Sheets

Related U.S. Application Data

(60) Provisional application No. 62/331,264, filed on May 3, 2016.

(52) U.S. Cl.
CPC .... *G01B 3/1041* (2013.01); *G01B 2003/1015* (2013.01); *G01B 2003/1058* (2013.01); *G01B 2003/1066* (2013.01); *G01B 2003/1089* (2013.01)

(58) Field of Classification Search
CPC ............ G01B 2003/1092; G01B 3/004; G01B 3/1084; G01B 5/004
USPC ................................ 33/755–771, 494, 679.1
See application file for complete search history.

(56) References Cited

U.S. PATENT DOCUMENTS

| | | | | |
|---|---|---|---|---|
| 3,140,548 A * | 7/1964 | Paparozzi | ............. | B43L 13/208 33/564 |
| 3,399,459 A * | 9/1968 | Martin | ................... | G01B 3/004 33/494 |
| 3,744,134 A | 7/1973 | Zima | | |
| 3,795,982 A * | 3/1974 | Cunningham | .......... | B42F 19/00 33/494 |
| 4,205,448 A | 6/1980 | Asai | | |
| 4,603,481 A | 8/1986 | Cohen | | |
| 4,998,356 A | 3/1991 | Chapin | | |
| 4,999,924 A | 3/1991 | Shields | | |
| 5,379,523 A | 1/1995 | Wingert | | |
| 5,414,943 A * | 5/1995 | Vogt | ....................... | A61B 5/107 33/512 |
| 6,094,833 A | 8/2000 | Medley | | |
| 7,900,370 B1 | 3/2011 | Treige | | |
| 8,458,921 B2 * | 6/2013 | Hernandez | ................ | G01B 3/06 33/494 |
| 8,590,168 B2 * | 11/2013 | Abdel-Rahman | ........ | A41H 1/02 33/512 |
| 9,903,696 B2 * | 2/2018 | Stewart | ................ | G01B 3/1084 |
| 2012/0255190 A1 * | 10/2012 | Hernandez | ............. | G01B 3/004 33/679.1 |
| 2017/0322006 A1 * | 11/2017 | Stewart | ................... | G01B 3/004 |

* cited by examiner

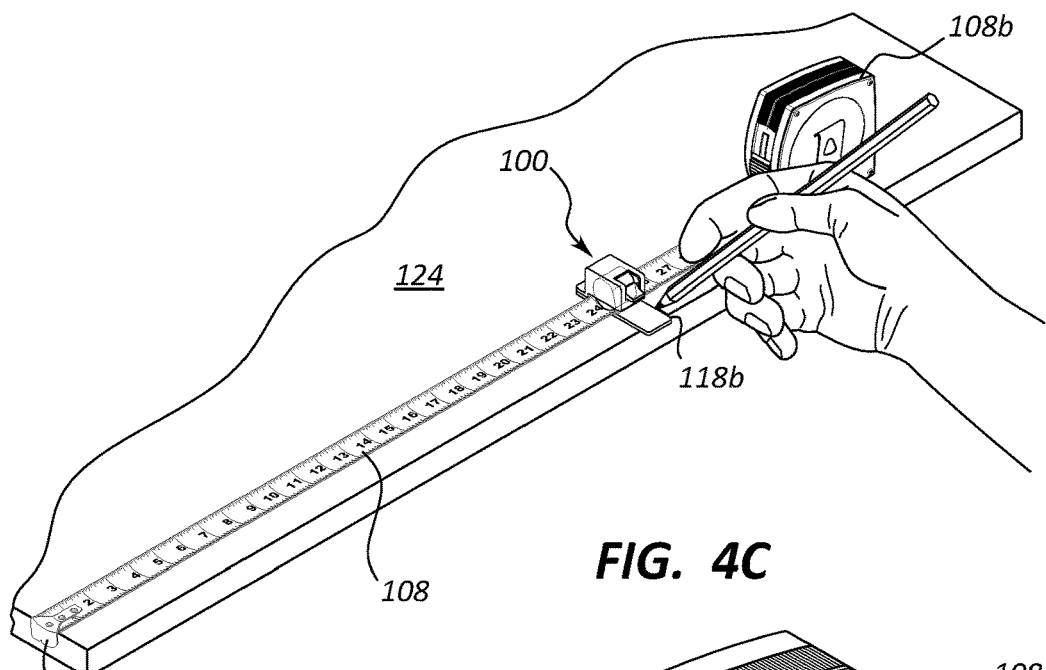
FIG. 4C
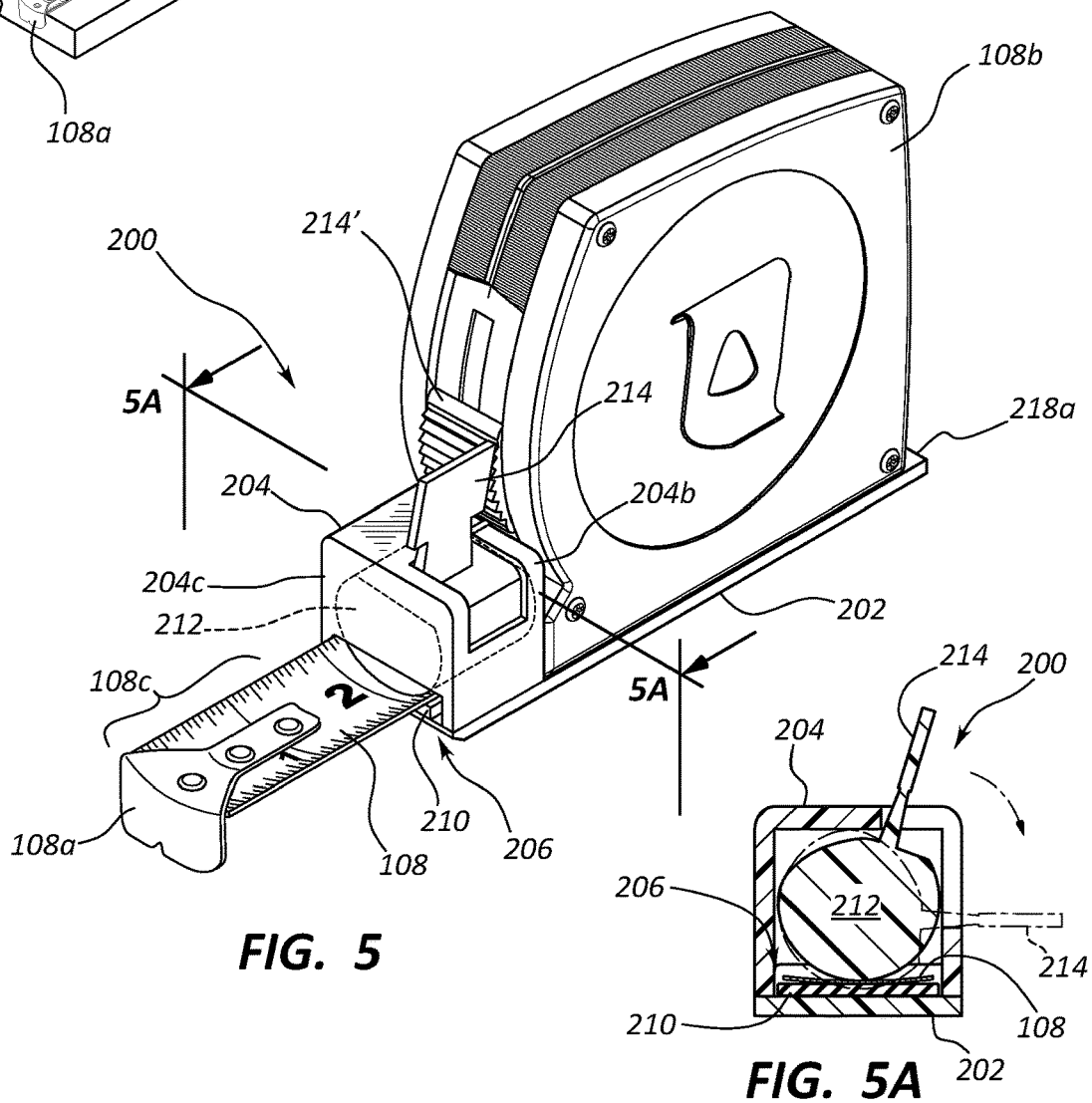
FIG. 5
FIG. 5A

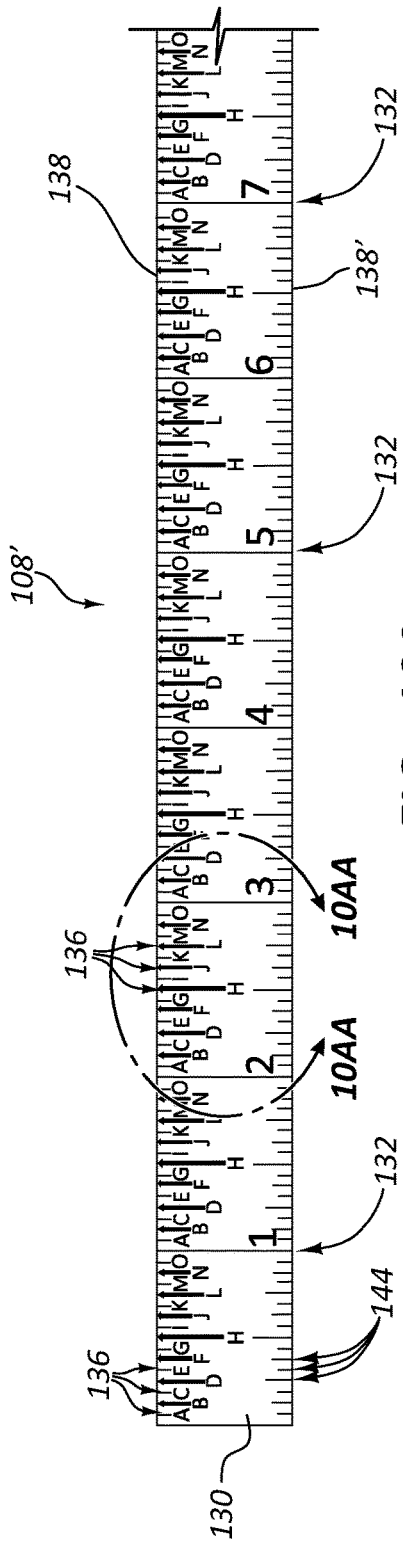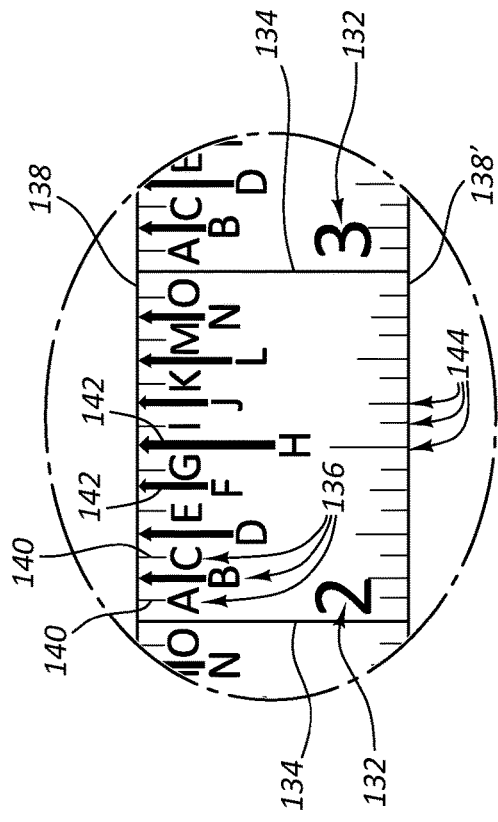
FIG. 10A
FIG. 10AA

MEASUREMENT DEVICES AND METHODS

CROSS-REFERENCE TO RELATED APPLICATION

The present application is a continuation-in-part of U.S. patent application Ser. No. 15/145,683, filed May 3, 2016, which claims the benefit of U.S. Provisional Patent Application Ser. No. 62/331,264, filed May 3, 2016, entitled "MEASUREMENT DEVICES AND METHODS". The disclosure of each of the foregoing is herein incorporated by reference in its entirety.

BACKGROUND OF THE INVENTION

1. The Field of the Invention

The invention relates to measurement devices, e.g., tape measures as used by those engaged in carpentry work, seamstresses, and others.

2. The Relevant Technology

Tape measures have been available for decades, and have changed little over the past few decades. One problem frequently encountered by anyone familiar with use of a tape measure is the necessity of remembering and/or communicating the value of a measured length. For example, a person often will measure a given space in a first location, and then will need to remember the particular value of that measurement (or tell it to an assistant), as they go to a second location to measure and then cut or mark a board or other object or material, or otherwise compare or use the length value just measured. For example, one may typically take the measured value from the first location, and then use that value to mark, cut, or otherwise employ the remembered value with a board or other material to be employed in construction at the first location. Under such circumstances, it is easy to forget or misremember what the value of the measurement was, or to have that value miscommunicated to an assistant. Such problems lead to wasted materials and effort. Also, for those who don't use a tape measure often, there is difficulty in understanding the markings that are typically found on the tape, especially when the measured length falls between two lines of marking.

Another commonly encountered situation occurs when measuring an inside dimension (e.g., distance inside a cabinet, or similar inside dimension). When using a tape measure to measure such an inside dimension, the housing of the tape measure itself is in the way, which becomes problematic. Current tape measures require the user to bend the tape, so that the tape extends the fill inside dimension, and to read the bent tape (which can be difficult to do accurately), or to extend the tape and the housing across the full inside dimension being measured, to then read the value on the tape at the front end of the housing, and then add a given value to the read measurement to account for the length of the housing itself. For example, if the drawn out distance of the tape is 22 and ⅜ inches, the housing will often include a notation indicating to the user how much to add to the measured value to account for the length of the housing. While for some tape measures this adjustment is a whole number (e.g., 2 inches or 3 inches), sometimes it is a fractional number (e.g. 2 and ¾ inches), making it very inconvenient for the user trying to determine the accurate inside dimension. Furthermore, the housing itself of the tape measure is typically not formed of straight edges, but includes bowed, rounded, and textured exterior surfaces, which introduces additional inaccuracy to such measurements.

It will be apparent that under such circumstances, it s easy for a user of existing tape measures to make a mistake in measurement (e.g., by not understanding the markings), to make a mistake in communicating the measured value to an assistant, to make a mistake in remembering the measured value, or even if the measurement is made more or less correctly, its value may be inaccurate (e.g., particularly for measured inside dimensions).

Further, even for those familiar with the markings on a tape measure (e.g., eights, sixteenths, or other fractions of a unit of measure, there is frustration associated with using traditional fractional markings typically found on a tape (e.g., whether a construction tape or a seamstress or fashion designer's tape. As such, there is a continuing need for improvements.

BRIEF SUMMARY

The first named inventor conceived of the present invention while building playhouses, where numerous cuts of identical length were required for boards to be used in construction of the play house, in using a tape measure to take the proper measurement, the measurement was remembered or communicated incorrectly, so that several boards were cut at the incorrect length, resulting in frustration and waste. In at least some embodiments, the present invention provides a device that allows a user (e.g., a professional carpenter, cabinet maker, do-it-yourselfer, or anyone using a tape measure) to take a measurement using a tape measure without requiring reference to measurement indicia that may be provided on the tape. Because no reference to such indicia is needed, the user is much less likely to make a mistake.

In an embodiment, the present invention is directed to a device that includes or is attachable to a tape measure, for use therewith. The device may include a base member, and a housing supported on the base member that includes a slot for slidably receiving a tape of the tape measure so that the tape can be inserted through the slot of the housing. An elastomeric gripping layer may be positioned in the housing, positioned to contact a face (e.g., bottom) of the tape when the tape is locked in a given position during use. A movable pressure locking wedge may be provided, positioned within the housing so that the tape is pinchable between the pressure locking wedge and another surface without damaging the tape. In some embodiments, that other surface is the elastomeric gripping layer. A handle may be operable to move the pressure locking wedge, which allows the user to move the wedge (e.g., rotate it, or move it vertically downward), selectively locking the tape between the pressure locking wedge and the other surface upon actuation of the handle. In an embodiment, the handle is attached to the pressure locking wedge. In another embodiment, the handle may not necessarily be directly attached to the pressure locking wedge, but movement of the handle operates to move the wedge, as will be explained in further detail herein.

Another embodiment is directed to a device attached or attachable to a tape measure, including a base member, a housing supported on the base member including a slot for slidably receiving a tape of the tape measure insertable through the slot of the housing, and an elastomeric gripping layer positioned at the bottom of the slot of the housing over which the tape slides during use. A movable (e.g., rotatable, or downward slidable) pressure locking wedge may be positioned within the housing so that the tape is positioned between the wedge and the elastomeric gripping layer during use. In another embodiment, the elastomeric gripping layer may be disposed on the movable pressure locking wedge, so that pinching of the tape occurs between the elastomeric gripping layer and another surface (e.g., a stationary wedge). Various examples of such embodiments will be described in further detail below. A handle may be operable to move the pressure locking wedge, which allows the user to move the wedge, allowing locking of the tape between the pressure locking wedge and whatever surface is opposite the movable wedge (e.g., the elastomeric gripping layer, or another surface such as a stationary wedge).

Providing an elastomeric gripping layer that contacts the tape, so as to be involved in the pinching of the tape in some way, provides very tight locking of the tape, making it very difficult for a user to intentionally or inadvertently pull or push the tape in (which would undesirably shorten or lengthen the locked distance associated with the particular locked position). For example, those of skill in the art will appreciate that many existing tape measures include a lock built into the tape measure, which helps to hold the tape at a given extension. While this is so, the lock provided by such existing structures is not particularly tight, so that a user may intentionally or inadvertently cause the tape to retract or be further extended by pushing or pulling the tape with a relatively small force. Such a pushing or pulling force will be insufficient to cause the locking structures described herein to retract or extend the tape. For example, the present inventors have found that a 5 lb weight can be attached to the tape, and with the handle in the locked position, it remains locked. Further, it will be appreciated that the locking structures described herein may be provided in addition to the traditional lock provided with state of the art tape measures. In other embodiments, the presently described locking mechanism may replace the typical lock provided with a tape measure (e.g., where the device is incorporated into, or built-in to a tape measure).

The present invention also extends to methods of use, which allow a user to take a measurement, e.g., between first and second points, without requiring the tape to include measurement indicia, as the method does not require reference to such indicia that are typically included on a tape measure. Indeed, in an embodiment of a device that is "built-in" to a tape measure, the tape may not necessarily include such indicia. Such a method may include extending one end (e.g., a leading edge) of a tape to the first point, while aligning a straight edge of the device (e.g., referred to as a locking device) that locks to the tape with the second point, so as to define the measurement as between the end of the tape and the straight edge of the locking device. With the locking device locked to the tape, the tape may then be moved to a board or other object or material to be cut, marked, compared, or otherwise used with the measurement. For example, the leading end of the tape may be positioned at one end of the board or other object or material, and the straight edge of the locking device is then positioned at a point at which the board or other material is to be cut or marked, compared, or the like. If the board or other material is to be cut or marked with the measurement, the user may then cut or mark the board or other material at the straight edge, so as to translate the measurement taken from between the first and second points to the board or other material, without requiring reference to any measurement indicia that may be on the tape. It will be apparent that such a locking device and tape measure can similarly be used in any other use typically employed for a tape measure (e.g., other than measurement comparisons, marking, or cutting).

While described as performed in the context of a tape, it will be appreciated that the term tape is to be construed broadly, and as no indicia are required on the tape, a string, cord, filament or other high tensile strength line may alternatively be employed. Similarly, telescoping rods or other members could take the place of a traditional "tape", being extended from the first point to the second point, providing a similar result. Such alternate structures are thus to be construed as within the scope of the term "tape" as employed herein. Of course, a typical, flat (or concavely curved) elongate thin ½ inch, ¾ inch, 1 inch wide or other dimensioned traditional tape could be employed.

Another embodiment of the present invention is directed to a device for measurement that addresses at least some of the difficulty and frustration associated with traditional measuring tape markings, particularly the fractional markings. The term marking may be used interchangeably herein with indicia. Such a device may include a substrate (e.g., a tape, or other with first indicia, and second indicia. The first indicia may comprise numeric measurement indicia regularly spaced to mark inches or other units of length along the tape or other substrate. The second indicia. May comprise non-numeric measurement indicia (e.g., letters), also regularly spaced, but to mark fractions of inches or other units of length. The letter markings have been found to be much less frustrating and easier to use than traditional fractional markings included in tape measure devices, allowing a user to simply lay the tape adjacent to or upon something to be measured, and to easily note where the measurement falls (e.g., 38 inches and the fractional marking F (i.e., 38 F). The fractional (e.g., letter) markings may be color coded, to even better facilitate easy recognition of the needed measurement through the visual aid provided by color coding the fractional markings or indicia.

Such indicia or marking embodiments may be incorporated into a tape measure, a table saw, a workbench, a cutting mat (e.g., rotary cutting mat), a sewing machine, or any other situation in which traditional measurement markings are sometimes included, which may also include product marking. Such embodiments may be included within a tape measure as described above and elsewhere herein, e.g., including a elastomeric gripping layer used to aid in locking the tape in a given position.

Such measurement system could be incorporated into a product marking (e.g., sizing charts or the like), e.g., by noting "size 38 F" or other corresponding length as provided by the present measurement system. Such product marking could be placed on drapes, blinds, windows, doors, cabinets, or any other product where a length dimension is to be communicated. In other words, instead of or in addition to providing a typical length dimension, the length dimension could be provided using the present measurement system (e.g., where 38 F corresponds to 38 and ⅜ inches).

These and other advantages and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4C shows the tape measure and device of FIG. 4B, with the device locked in place, moved to a board being marked (e.g., for cutting) at the appropriate measured dimension.

FIG. 5 shows another exemplary device, attached (e.g., permanently or removably fixed) to a tape measure, where the housing of the device is separate from the tape measure.

FIG. 5A shows a cross-sectional view through the device of FIG. 5, showing how actuation of the handle can selectively pinch the tape between the pressure locking wedge and the elastomeric layer housing of the device.

FIG. 10A shows a plan view of the tape, including the alternative indicia as seen in FIG. 9.

FIG. 10AA shows a blow up portion of the tape of FIG. 10A, to better label some of the features.

DETAILED DESCRIPTION OF DISCLOSED EMBODIMENTS

I. Introduction

Figure 1:
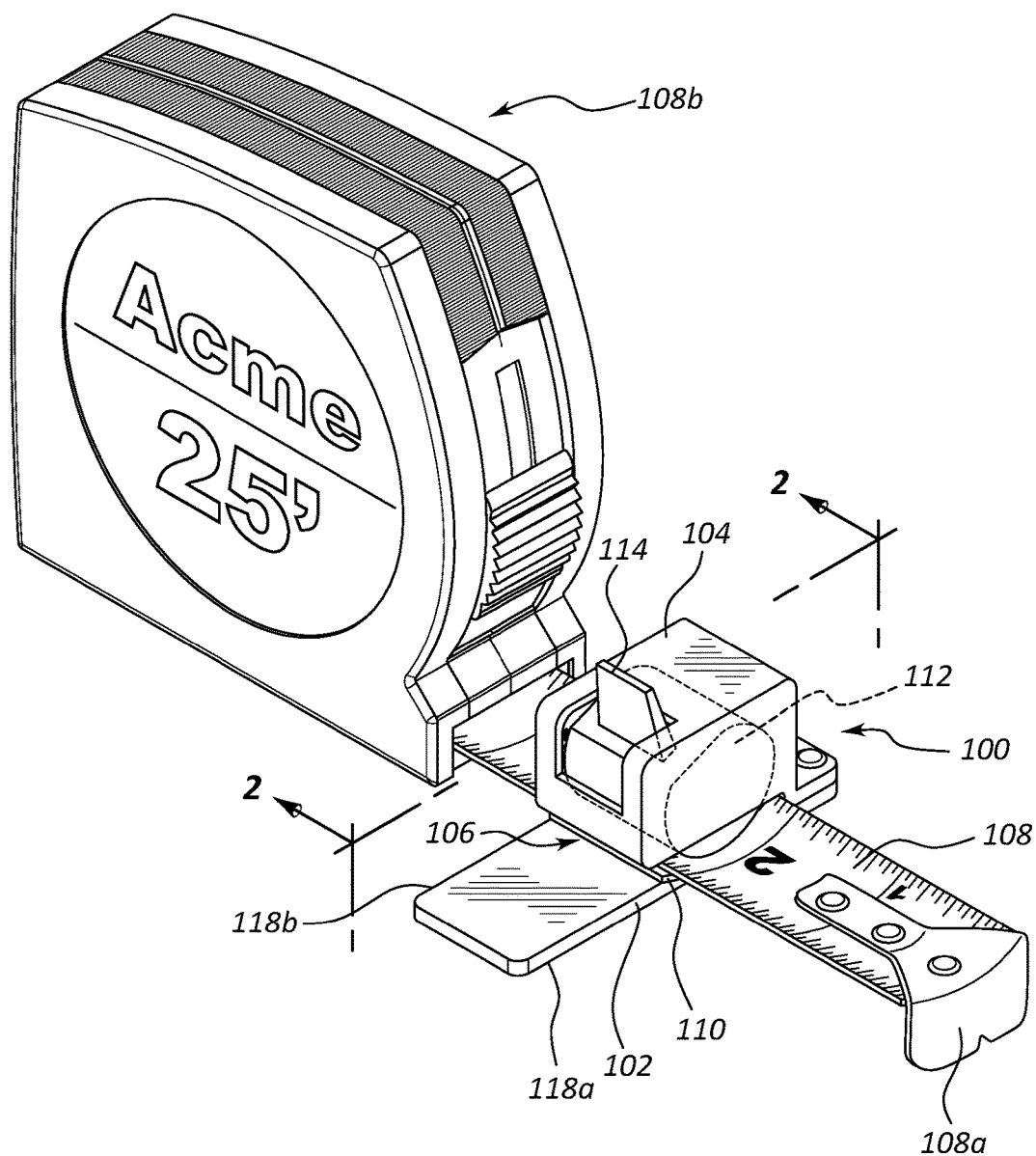
FIG. 1 is a perspective view of an exemplary device that is shown attached to a tape of a tape measure, according to an embodiment of the present invention.

Embodiments of the disclosure relate to devices and methods that allow a user to take a measurement (e.g., using a tape), and then take that measurement to another location where a board or other material is to be cut, marked, compared, or the like with the measurement. According to one such embodiment, a device that is attachable to, or included with a tape measure may include a base member, a housing supported on the base member including a slot for slidably receiving a tape of the tape measure insertable through the slot of the housing, and an elastomeric gripping layer positioned in the housing, positioned to contact a face of the tape when the tape is locked in a given position during use. A movable pressure locking wedge may be positioned within the housing, which assists in locking the tape in the desired given position as the tape is pinched between the pressure locking wedge and another surface (e.g., the elastomeric gripping layer, or another surface). A handle may be operable to selectively move the pressure locking wedge, so as to allow selective locking of the tape between the wedge and another surface upon actuation of the handle.

An exemplary method may employ a device as described above, so as to provide the ability for a user to take a measurement, e.g., between first and second points, without requiring that the user reference any measurement indicia that are typically present on a tape. The method may allow a user to easily measure inside or outside dimensions, without having to remember any measured values, and without having to add a length associated with the length of a tape measure housing when measuring an inside dimension. Such a method may include extending one end (a leading edge) of a tape to a first point, while aligning a straight edge of the locking device with the second point, so that the measured length is defined between the end of the tape (the leading edge of the tape at the first point) and the straight edge of the locking device. When the end of the tape and the straight edge are thus aligned with the first and second points, the locking device is locked to the tape, locking the given measurement into the device and tape, so that it is "remembered" or recalled as the device and tape are moved to another location where the information of that measurement can be used.

For example, in this locked condition, the tape and locking device may be moved from the measurement location (where the first and second points are) to a board, or other material to be cut, marked, or compared with the given measurement length, h will be apparent that such a method allows the board or other material to be cut or marked using the locked in distance measurement without requiring the user to reference any of the measurement indicia (e.g., inches, fractions of inches, centimeters, fractions of centimeters, etc.) that may be present on the tape measure.

Additional embodiments of the present invention relate to measurement devices that address at least some of the difficulty and frustration associated with fractional markings of traditional measuring tapes. Such a device may include first indicia and second indicia. The first indicia may include numeric measurement indicia equally spaced to mark inches or other units of length along the tape or other substrate including the indicia. The second indicia may include non-numeric measurement indicia (e.g., letters), also regularly spaced, but to mark fractions of inches or other units of length. The letter markings may be regularly spaced, and progress from A to O (or whatever), between adjacent first indicia. For example, the letters A through O may be positioned at sixteenth inch intervals between the "1" and "2" of the device. The letters may simply repeat between each next set of adjacent first indicia (repeat A-O between "2" and "3", and so forth.

Such indicia or markings have been found to be much less frustrating and easier to use than traditional measurement markings included in tape measure devices, allowing a user to simply lay the device and object upon or adjacent to one another for measurement, and to easily note where the measurement falls (e.g., 38 inches and the fractional marking F (i.e., 38 F, which may equate to 38 and 3/8 inches). The fractional (e.g., letter) markings may be color coded, may include alternating vertical lines and vertical arrows, and other features to even better facilitate easy recognition of the needed measurement through the visual aid provided by such features.

Such indicia or marking embodiments may be incorporated into tape measures, table saws, workbenches, cutting mats, sewing machines, or any other structure in which traditional measurement markings would be useful.

II. Exemplary Measurement Devices and Methods

Figure 2:
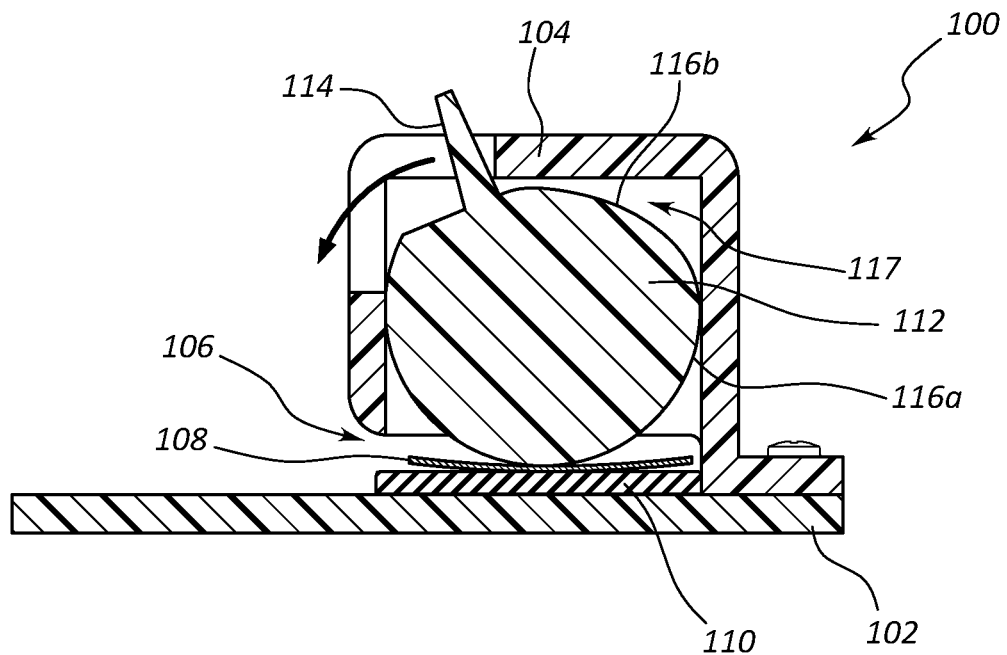
FIG. 2 is a cross-sectional view through the device of FIG. 1, showing how the tape of a tape measure may be received through the tape receiving slot of the device, with the tape freely slidable along its length through the slot.
Figure 3:
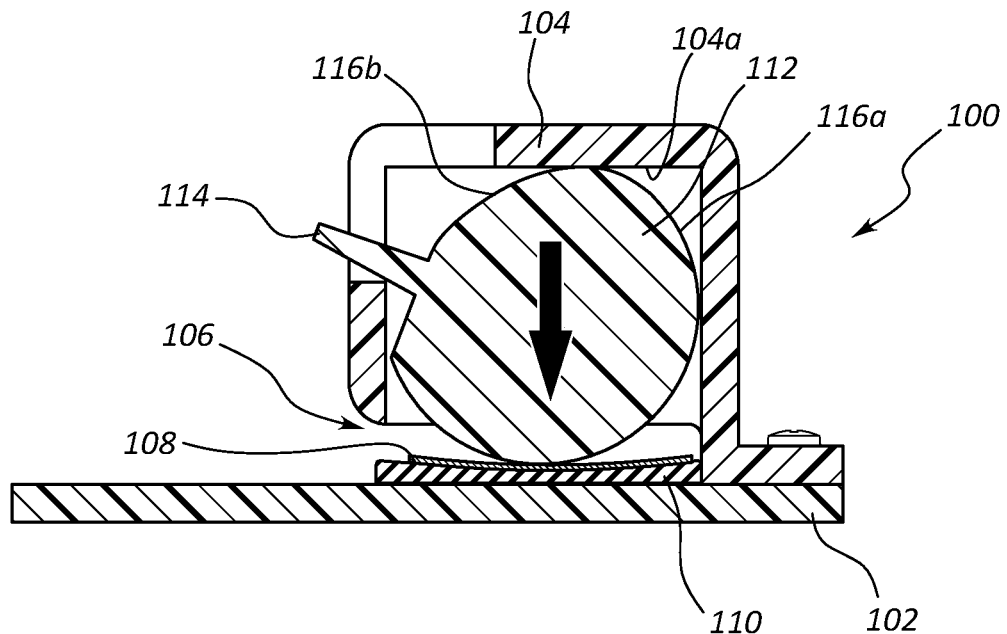
FIG. 3 is a cross-sectional view similar to that of FIG. 2, but in which the handle connected to the pressure-locking wedge has been rotated downward, pinching the tape within the device, so as to hold the device to the tape in a given position.
Figure 6A:
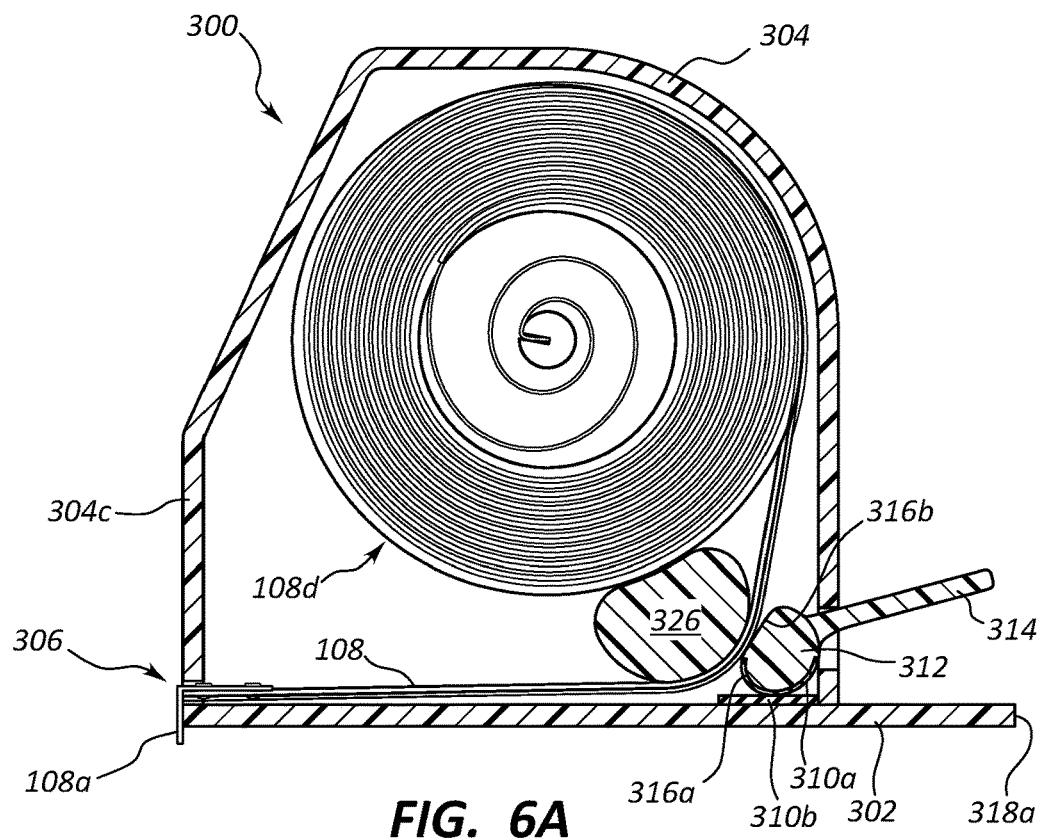
FIG. 6A shows another exemplary device, integrated into a tape measure, with the housing of the device also housing the tape of the tape measure, with the movable pressure locking wedge of the device in an unlocked position.
Figure 6B:
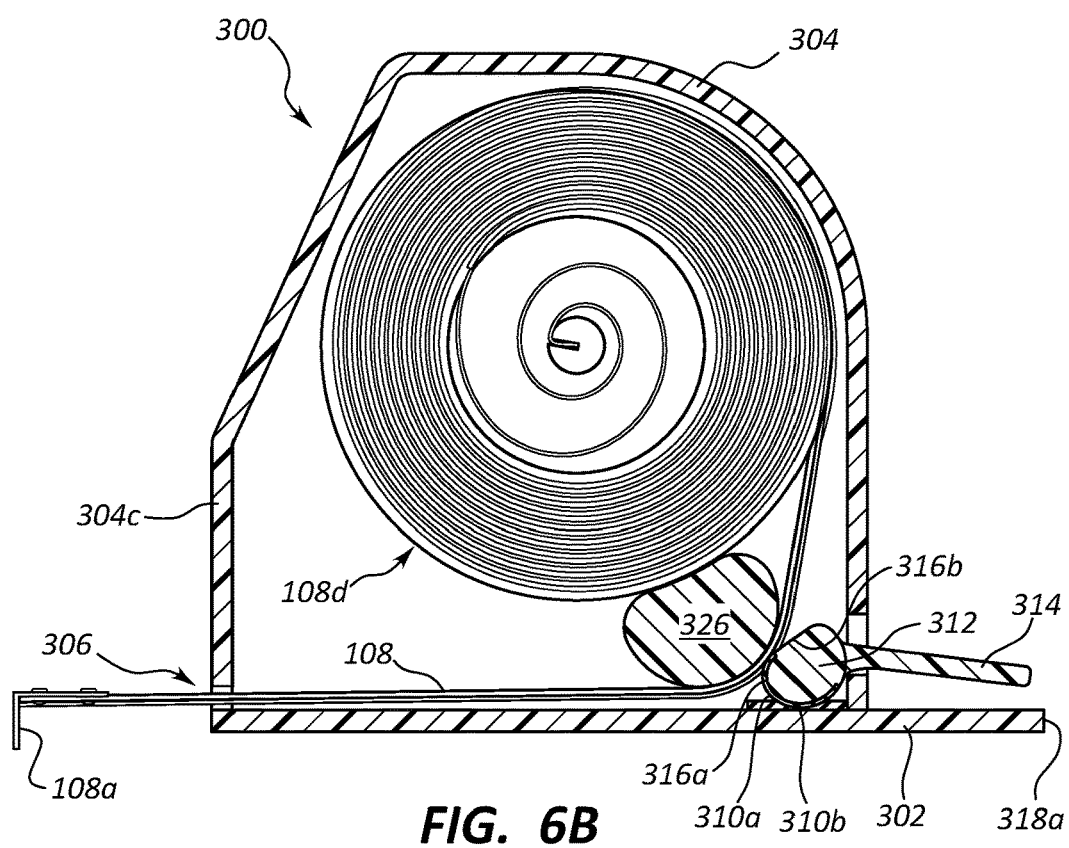
FIG. 6B shows the device of FIG. 6A, with the leading edge of the tape of the tape measure extended out from the housing to a desired length, and the movable pressure locking wedge of the device in a locked position.

FIGS. 1-3 illustrate an exemplary device 100 according to one embodiment of the present invention that may be attached to, or used with a tape measure 108b. For example, device 100 is shown as including a base member 102, with a housing 104 supported on base member 102. Housing 104 is shown as including a slot 106 that allows a tape 108 of tape measure 108b to be received into the slot 106 of housing 104. An elastomeric gripping layer 110 may be positioned in housing 104 to contact a face (e.g., a back face) of the tape 108 when the tape is locked in a given position during use. In the illustrated embodiment of FIGS. 1-3, elastomeric gripping layer 110 is shown disposed on the base member 102, inside housing 104. Additional or other placements are possible, e.g., FIGS. 6A-6B shows the elastomeric gripping layer positioned elsewhere (e.g., on the movable pressure locking wedge). Layer 110 may be planar (e.g., with tape 108 being concavely and convexly curved). In another embodiment, layer 110 may be concavely curved to better mate with the bottom face of tape 108, which is typically convexly curved.

Device 100 is further shown as including a movable pressure locking wedge 112 within the interior of housing 104. Wedge 112 is movable, e.g., rotatable or movable downward, so as to pinch the tape 108 between layer 110 (or another surface) and wedge 112. In the illustrated example, a handle 114 is shown operable to move wedge 112, allowing selective locking of the tape 108 between wedge 112 and layer 110 upon actuation of handle 114. In FIG. 1, handle 114 is directly connected to wedge 112. In other embodiments (e.g., see FIGS. 7A-7B), connection of handle 114 to wedge 112 is not required for the handle to be operable to move wedge 112.

As shown in FIGS. 2-3, in the illustrated configuration, wedge 112 includes a concavely curved outer surface 116a, as well as a flattened or reduced surface 116b. With the handle 114 in an unlocked position (e.g., upward, not yet rotated downward, as seen in FIG. 2), there is a gap 117 between housing 104 (e.g., roof 104a of housing 104) and internally disposed wedge 112 (particularly flattened surface 116b). Upon rotation of handle 114 downward to its locking position, the outer surface 116 of wedge 112 rotates, eventually striking roof 104a of housing 104. For example, such striking may occur at or near where the regular convex curvature 116a of outer surface 116 resumes (i.e., where surfaces 116a and 116b meet).

By flattened or reduced surface 116b, it is meant that the exterior surface is reduced as compared to what it would be if the regular (e.g., constant radius) exterior surface of a convex curvature such as at 116a were simply continued over portion 116b. In some embodiments, this could be achieved by defining a wedge that would have a cylindrical shape (circular convex cross-section), and by simply removing portions of said shape to create flattened or reduced surface 116b, e.g., as shown in FIGS. 2 and 3. By flattened surface 116b, it is not required that the surface actually be flat or planar. Rather, it may simply be reduced as shown, to create a gap 117, which gap can be closed upon rotation of wedge 112 to cause the unreduced surface or portion 116a to strike housing 104, closing gap 117.

Those of skill in the art will appreciate that other shaped outer surfaces us non-circular surfaces) may similarly be rotated to alternate from providing a gap such as gap 117, to providing engagement, and force application between housing 104 (or another structure), pressing wedge 112 into towards layer 110, so as to pinch tape 108 therebetween. Thus, it will be appreciated that the illustrated embodiment is merely exemplary. The illustrated engagement effectively removes gap 117 that previously existed between roof 104a of housing 104 and wedge 112, so that if tape 108 is in slot 106, it becomes pinched between layer 110 and wedge 112, as shown in FIG. 3. The arrow in FIG. 3 shows how such pinching force is applied upon actuation of handle 114 to pinch tape 108.

When a gap 117 is present (see FIG. 2) the tape 108 is not pinched, but is free to slide within slot 106 (into and out of the page in FIG. 2), as some clearance is present between wedge 112, between housing 104 and elastomeric gripping layer 110. This allows the user to slide the tape 108 to a desired extension, e.g., positioning a first end of the tape at a first end of a dimension being measured. In this slidable configuration, the tape 108 may even be removed from under housing 104, through slot 106, as will be apparent from FIG. 1. Still referring to FIG. 1, in the unlocked, configuration where tape 108 is slidable in device 100, the straight edge 118a or 118b of base member 102 may be advanced to the opposite end of the dimension being measured (with the tape 108 sliding through slot 106 as this occurs). When the first end (leading end 108a) of the tape 108 is positioned at the first end of the dimension being measured, and one of straight edges 118a or 118b is at the second end of the dimension being measured, the handle 114 is actuated, locking device 100 to tape 108. In this locked configuration, the tape 108 and device 100 includes the desired dimension—defined between the first end 108a of the locked tape and the straight edge 118a or 118b.

Figure 4A:
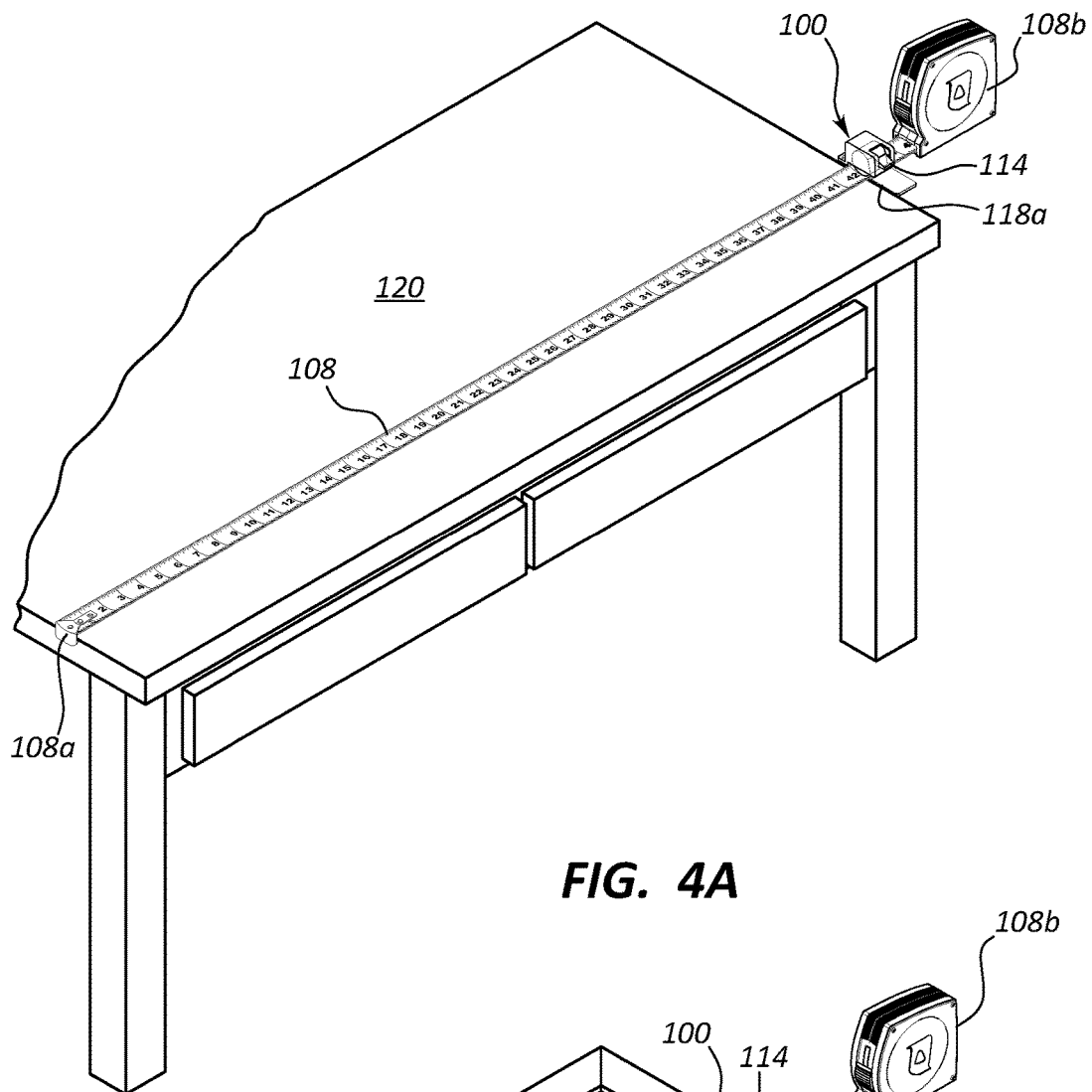
FIG. 4A shows the tape measure and device of FIGS. 1-3 being used to measure and then pinch or clamp the tape at a desired "outside" dimension (e.g., show measuring a desk width).
Figure 4B:
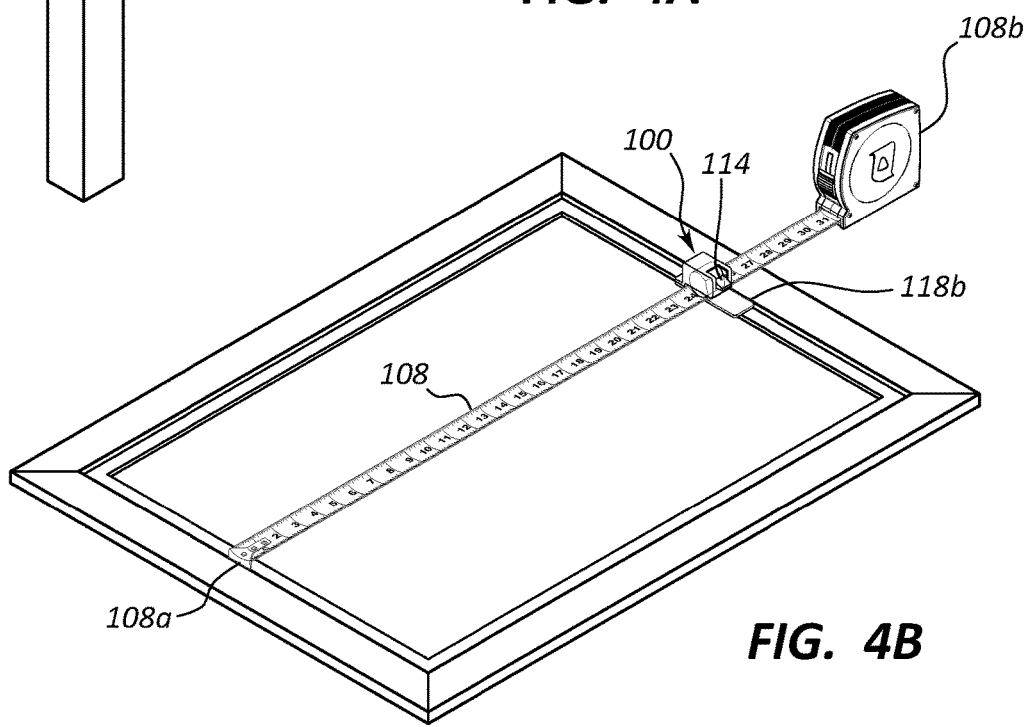
FIG. 4B shows the tape measure and device of FIGS. 1-3 being used to pinch or clamp the tape at a desired "inside" dimension (e.g., shown measuring the inside dimension of picture frame, although this could also be done with the inside of a cabinet or other inside dimension).

How such a measurement may be made and locked into the device 100 and tape 108 is shown in FIGS. 4A and 4B. For example, FIG. 4A shows the leading end 108a of tape 108 positioned at one end of an object or distance to be measured (e.g., the width of a desk or tabletop 120 in FIG. 4A), with straight edge 118a being aligned with the other end of the object or distance being measured. It will be appreciated that in use, instead of aligning the end of object or distance 120 with edge 118a, edge 118b could alternately be used. With the alignment provided as desired, handle 114 is moved to the locked position, locking the tape 108 to device 100 at the desired distance along tape 108. It will be apparent that in this locked configuration, the tape 108 and device 100 includes the desired length incorporated, or "locked" therein, so as to allow the user to then move tape 108 and device 100 (e.g., to a board or other object or space) for the measured length to be transferred thereto. Such moving and transference of the measurement does not require the user to use or otherwise reference any measurement indicia that may typically be present on a tape measure, as the dimension is defined between leading end 108a and the selected straight edge 118a, or 118b.

In an embodiment, only one straight edge (118a or 118b) may be provided, to reduce any risk that a user may forget which edge was selected. For example, the other edge could be made wavy, curved, or any other non-orthogonal shape, so as to provide only one "straight edge" for reference.

FIG. 4B shows similar use as in FIG. 4A, but showing how the device 100 and tape 108 may be used in measuring an inside dimension, such as the illustrated interior dimension of a picture frame. Other inside dimensions, such as that of a cupboard, doorway, or cabinet may of course be measured, and "locked" or "remembered" by the tape 108 with device 100 locked thereto. FIG. 4B shows the leading end 108a of tape 108 positioned at one end of the inside dimension to be measured, with straight edge 118b being aligned with the other end of the inside dimension being measured. With the alignment provided as desired, handle 114 is moved to the locked position, locking the tape 108 to device 100 at the desired distance along tape 108.

It will be apparent that in this locked configuration, the tape 108 and device 100 includes the desired length incorporated therein, locked in place, so as to allow the user to then move tape 108 and device 100 (e.g., to a board or other object or space) for the measured length to be transferred thereto. Such moving and transference of the measurement does not require the user to use or otherwise reference any measurement indicia that may typically be present on a tape 108, as the dimension is defined between leading end 108a and the selected straight edge 118b. By way of example, FIG. 4C shows how device 100 with tape 108 locked in the same relationship as in FIG. 4B, has been moved from the inside dimension measuring environment, to a board or other object to which the measurement is to be transferred to. As shown, the leading edge 108a of tape 108 may be aligned with an end of board 124 (or elsewhere on board 124, as desired), and marked along straight edge 118b, effectively translating the measured inside dimension from FIG. 4B, to the board of FIG. 4C. All such movement and marking may be accomplished with the device 100 remaining locked to tape 108, as described herein (e.g., by rotating handle 114 to the locked position).

It will be apparent that the device 100 as shown as described in conjunction with FIGS. 1-4C may be separate from the typical tape measure device 108b into which tape 108 may be spooled. Device 100 may thus be separate, but attachable to, tape measure 108b. In other embodiments, the device may be permanently fixedly) attached to a tape measure 108b, as seen in FIG. 5, or with the device and tape measure otherwise incorporated together (see FIGS. 6A-7C).

The housing and other components of the device may be formed from any suitable materials. In an embodiment, one or more of the housing, handle, base member, and wedge may comprise any of various durable plastic materials, such as acrylic or similar strength plastics. Other materials, such as aluminum, anodized aluminum, aluminum alloys, and the like may also be used. For the elastomeric gripping layer, any suitable elastomeric material may be used, e.g., rubber materials, latex, silicone, thermoplastic elastomers, thermoset elastomers, and the like may be suitable for use. Such materials provide gripping characteristics, and resist the tape sliding thereover, particularly when pinched against such an elastomeric layer.

FIG. 5 shows a device 200 providing similar advantages as device 100, but which is provided attached (e.g., permanently fixed, or removably attached) to a tape measure device 108b. Device 200 includes a base member 202 on which is supported the tape measure device 108b at one end, and housing 234 at the other end. Housing 204 includes a slot 206 that slidably receives tape 108 of tape measure 108b, so as to be slidably extended through slot 206. Leading edge 108a (e.g., as well as a thickened riveted portion 108c of tape 108) may remain outside of housing 204 and slot 206. A movable pressure locking wedge 212 may be provided in a similar manner as described in conjunction with device 100, with a handle 214 for selectively locking wedge 212 downward, pressing tape 108 to lock it in a desired extension out of tape measure 108b.

While a conventional tape measure lock 214 is shown with tape measure 108, those of skill in the art will appreciate that although such tape measures are provided with such a mechanism to lock an extension of the tape 108, such existing locking mechanisms are not particularly reliable, so that even if the lock 214' is "locked", the tape 108 can be pushed in or pulled out of tape measure 108 with application of minimal force. Where a tape measure 108 is provided with the present inventive device that includes its own locking mechanism in the movable pressure locking wedge, it will be appreciated that no such lock 214 need be provided with the tape measure 108b. For example, this may be particularly so where the tape measure 108b is provided with the inventive device, either permanently fixed to, or removably attachable to, the tape measure 108b. Thus, the inventive devices may be used with a tape measure that includes, or does no include, such a conventional lock 214'

As described above, the wedge 212 within housing 204 serves to pinch tape 108 between wedge 212 and another surface, such as elastomeric gripping layer 210. As explained in conjunction with FIGS. 2 and 3, and also shown in FIG. 5A, handle 214 may be connected to wedge 212, or otherwise operable to move wedge 212, allowing selective locking of tape 108 between wedge 212 and layer 210 or another surface under tape 108 (e.g., and in housing 204) upon downward rotation or other actuation of handle 214.

In the embodiment seen in FIGS. 5 and 5A, it will be seen that slot 206 is somewhat differently configured relative to slot 106 of device 106. For example, in slot 106 of device 100, the slot is open on three of the four sides of the illustrated housing 104, which allows the tape 108 to be completely removed from the slot 106, housing 104, and device 100. In device 200, slot 206 is shown as closed on two opposite sides, and being open at the other two opposite sides of housing 204, so that tape 108 is fed through an open side of housing 204 between base 202 and housing rear wall 204b, and then extending through housing 204 to exit at slot 206 between housing front wall 204c and base 202. In the illustrated embodiment, housing 204 may include a joint between itself and base 202, e.g., to be attached thereto during mechanical assembly by the manufacturer. For example, such may allow tape 108 to be enclosed within housing 204, as shown.

This configuration provides an embodiment in which tape 108 is not readily removable from housing 204 of device 200, but can simply be reeled into or out of tape measure 108*b*, through housing 204. By way of example, if no leading edge 108*a* or riveted section 108*c* were present (e.g., if the leading end of the tape 108 were the same thickness as the rest of tape, or at least thin enough to fit through slot 206 of housing 204), it may be possible to disconnect tape 108 from device 200, although with the illustrated leading edge and/or rivets, the attachment is permanent as a practical matter. By permanent, it is meant that the tape 108 is not removable from the device without disassembling breaking the device or tape.

In addition, base member 202 is differently configured as compared to base member 102 of device 100. For example, base member 102 is shown as extending with a longitudinal axis that is orthogonal (e.g., 90° to) the longitudinal axis of tape 108. In base member 202, the longitudinal axis of base member 202 is parallel to (e.g., and below) the longitudinal axis of tape 108.

Movable pressure locking wedge 212 of device 200 may be similarly configured as wedge 112 of device 100, e.g., similarly including a convex outer surface, and an adjacent outer surface which has been flattened or reduced relative to the radius of curvature of the adjacent convex outer surface. The flattened surface need not be fully planar or flat, but merely sufficient to provide the wedge with a non-circular outer surface, which upon rotation allows a location of the outer surface to impinge upon some other structure (e.g., housing 204), resulting in a downwardly applied locking force. Such force pinches tape 108 between wedge 212 and the elastomeric layer 210, or some other structure. In other words, as described above in conjunction with device 100, a gap may be defined between wedge 212 and housing 204 when handle 214 is in the unlocked position, and as handle 214 is moved to the locked position, this gap is closed or otherwise eliminated, resulting in force engagement between wedge 212 (e.g., an upper surface thereof) and housing 204, resulting in a downwardly applied force that pinches tape 108, holding it in place.

As shown in the Figures, it is advantageous that the bottom surface of the wedge 212 that contacts tape 108 include a convex curvature that may match, or substantially match (e.g., radiused within some percentage of one another such as 25%, 10%, 5%, 3%, or 1%) a concave curvature which is typically provided within the top face of tape 108 (i.e., tape 108 is typically concavely curved on its top face, and convexly curved on its bottom face, as shown). Such curvature of the wedge 212 where it engages with tape 108 assists in more tightly gripping and pinching tape 108, particularly in combination with elastomeric gripping layer 110, e.g., positioned on the opposite side of tape 108. In some embodiments, the elastomeric gripping layer (or other engaging surface) could also include a corresponding concave curvature configured to receive the concavely curved bottom surface of tape 108.

The locking structures including a curved wedge and elastomeric gripping layer provide for very tight locking of the tape, when the handle is moved to the locked position. For example, the present inventors have found that a 5 lb weight can be attached to the leading edge 108*a* of the tape 108, oriented vertically downward (i.e., suspended therefrom), and the tape will remain locked. Thus, the locking mechanism may provide a locking force of more than 2 lbs, more than 3 lbs, more than 4 lbs, more than 5 lbs, more than 6 lbs, or more than 7 lbs (e.g., 5 lbs to 10 lbs, or more). Such a lock is far more reliable than conventional tape measure locks 214'.

Device 200 further includes a straight edge 218*a*. Straight edge 218*a* is parallel to leading edge 108*a* of tape 108, and orthogonal (e.g., 90°, or perpendicular to) the longitudinal axis of tape 108. Straight edge 218*a* is advantageous as it provides a well-defined end point to the measurement locked into the device 200, when such a device is used to measure an outside or inside dimension, as described in conjunction with FIGS. 4A-4C, above. Such an edge is better defined than the outer housing of typical tape measures (e.g., 108*b*) as shown, as such housings do not typically include a straight edge, but are often textured surfaces, that are bowed, and rounded. The straight edge 218*a* provides better accuracy as a measurement is taken and locked into the device (e.g., defined between leading edge 108*a* of tape 108 and straight edge 218*a*).

For example, the straight edge (e.g., 218*a*) may be vertical, and flat, at a rear end of the base member, behind the housing of the device (e.g., and behind tape measure 108*b*). This allows the flat rear end straight edge of the base member to be butted against an end of a dimension (inside or outside) and a leading edge of the tape to be extended in an opposite direction. The handle can be actuated to lock the tape between the pressure locking wedge and the elastomeric gripping layer or other surface, so that the dimension corresponds to the distance between the leading edge 108*a* of tape 108 and the rear end straight edge (e.g., 218*a*) of base member 202.

In an embodiment, the straight edge 218*a* may have a length that extends beyond the width of the rear of the housing of tape measure 108*h* (e.g., base member 202 may be L-shaped, with the bottom leg of the L being straight edge 218*a*, rather than a simple rectangular shaped base member 202. Of course, a rectangular shaped base member is also possible.

FIGS. 6A-6B illustrate another embodiment of a device 300, providing advantages according to the present invention. Device 300 fully integrates the locking mechanism provided by a movable pressure locking wedge 312 and an elastomeric gripping layer (e.g., 310*a*, 310*b*) into a tape measure device (e.g., device 300), rather than providing a device that is attached or attachable to a separate tape measure 108*b*. For example, device 300 includes a base member 302 with a housing 304 supported thereon. A slot 306 is provided at a front end of device 300, defined between base member 302 and the front wall 304*c* of housing 304. Tape 108 is shown provided spooled (at 108*d*) within housing 304, so that device 300 integrates tape 108, rather than working with a separate tape measure 108*b*, which provides the tape 108. Spooling of tape 108 may be provided by any suitable mechanism, e.g., those currently employed in tape measures (e.g., tape measure 108*b*), as will be appreciated by those of skill in the art.

No conventional lock 214' is shown, as device 300 includes locking mechanism such as those described herein. For example, a movable pressure locking wedge 312 may be provided, positioned within housing 304, and with a handle 314 connected to the pressure locking wedge 312 or otherwise operable therewith. In the illustrated embodiment, rotation of handle 314 moves (e.g., rotates) wedge 312 to pinch tape 108 between wedge 312 and another surface, in the device of FIG. 300, the other surface is stationary wedge 326. Stationary wedge 326 thus may be positioned within housing 304, on one side of unspooled tape 108, with movable pressure locking wedge 312 on the other side of stationary wedge 326. For example, the movable pressure locking wedge 312 may be engagable with the rear face of tape 108, while stationary wedge 326 may be engagable with the front face of tape 108.

One or both of wedges 312 or 326 may include an elastomeric gripping material disposed thereon, or otherwise comprise an elastomeric gripping material, to aid in the pinching of tape 108. For example, in the illustrated embodiment, an elastomeric gripping layer 310b may be provided under movable pressure locking wedge 312, and/or wrapped around a portion of the exterior surface of wedge 312, in the illustrated embodiment, a layer 310a is shown disposed along a portion of exterior surface 316 (e.g., convexly curved outer surface 316a). A flattened exterior surface 316b may also be provided, similarly to wedges 112 and 212. In an embodiment, the elastomeric gripping layer 310a may not extend over flattened surface 316b, but may stop short thereof. Flat 316b may provide a sufficient gap between wedge 312 (surface 316b) and tape 108 so that tape 108 is able to freely slide between wedges 326 and 312 when handle 314 is in the unlocked position. In other words, a user may freely pull on leading edge 108a, extending tape 108 to any desired distance out of housing 304, when handle 314 and movable locking wedge 312 are in the unlocked position, as shown in FIG. 6A.

FIG. 6B illustrates the arrangement when handle 314 is rotated downward or otherwise actuated (movement or rotation could be in another direction), locking tape 108 at a desired extension between stationary wedge 326 and movable wedge 312. For example, leading edge 108a may be pulled to extend tape 108 out from housing 304 to a desired length, and when that length is reached handle 314 is rotated downward, locking tape 108 in place, as shown in FIG. 6B.

In FIGS. 6A-6B handle 314 and wedge 312 are shown at a location that is below and behind spool 108d of tape 108, about which spool tape 108 winds. Such a spool may be configured to automatically spool tape 108, absent a pulling force on the tape (e.g., at leading edge 108a), or a locking force (e.g., at wedge 312). With handle 314 behind spool 108d, and thus extending out of housing 304 in the same direction (rearwardly) as where straight edge 318a of base member 302 is located, it may be advantageous to ensure that handle 314 is sufficiently short so as to not extend past straight edge 318a, as shown in FIG. 6A-6B, no matter the position of handle 314. This aids in ensuring that handle 314 does not interfere with the ability to abut straight edge 318a against a surface that may define one end of an inside dimension placing straight edge 318a against one end of the an inside of a cabinet, with the leading edge 108a of tape 108 at the other end of the inside dimension of the cabinet).

Figure 7A:
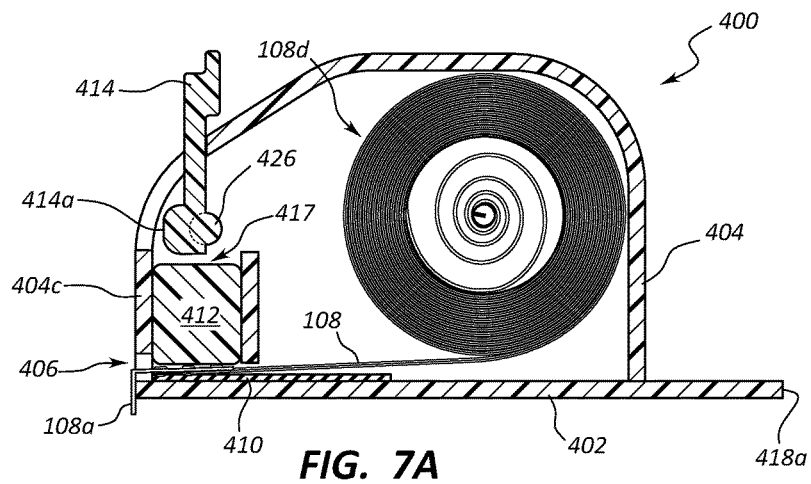
FIG. 7A shows another exemplary device, similar to that of FIG. 6, also where a housing of the device houses the tape of the tape measure, with the movable pressure locking wedge in an unlocked position.
Figure 7B:
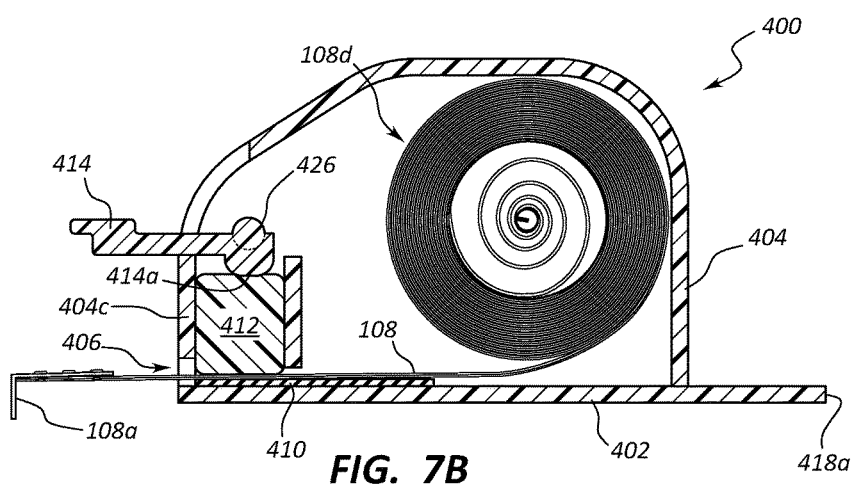
FIG. 7B shows the device of FIG. 7A, with the leading edge of the tape of the tape measure extended out from the housing to a desired length, and the movable pressure locking wedge of the device in a locked position.

FIGS. 7A-7B illustrate another embodiment of the inventive device of the present invention. Device 400 is similar to device 300, in that it includes spool 108d for tape 108 housed within housing 404, with housing 404 supported on base member 402. Rather than providing the pressure locking wedge and associated components for locking tape 108 at the rear of the device, such components have been provided towards the front of device 400. Similar to the other devices described herein, a slot 406 is shown provided in housing 404 (e.g., between front housing wall 404c and base member 402.

Provided within device 400 is a movable pressure locking wedge 412, and elastomeric gripping layer 410. Layer 410 is positioned to contact a face (e.g., rear face) of tape 108 when tape 108 is locked in a desired extended position using a handle 414. Handle 414 is operable to move pressure locking wedge 412, allowing selective locking of tape 108 between wedge 412 and another surface (e.g., layer 410) upon actuation of handle 414. Although the previously described embodiments show the actuating handle attached to the movable pressure locking wedge, device 400 includes a handle 414 that is not actually directly connected to wedge 412, but which is still operable to move wedge 412. Of course, those handles described herein that are connected to the associated movable wedge are also operable to move the pressure locking wedge. Device 400 includes a hinge 426, e.g., extending across housing 404 (e.g., attached to side walls thereof), which hinge 426 is attached to handle 414. Handle 414 is shown attached to one side of cylindrical hinge 426 (e.g., configured as a cylindrical dowel or pin). Upon rotation of handle 414 (and hinge 426), the arm 414a of handle 414 becomes interposed between hinge 426 and movable wedge 412, forcing wedge 412 downward, closing the gap 417 that previously existed (FIG. 7A) between wedge 412 and arm 414a, causing tape 108 to be pinched between wedge 412 and elastomeric gripping layer 410.

Figure 7C:
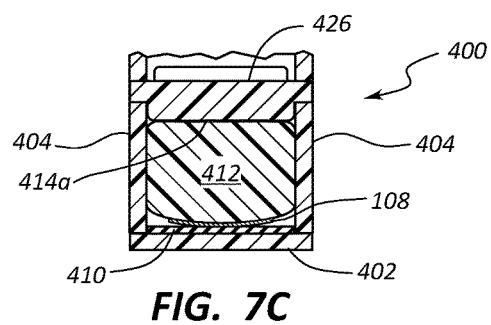
FIG. 7C shows a transverse cross-section through the device of FIG. 7B.
Figure 8A:
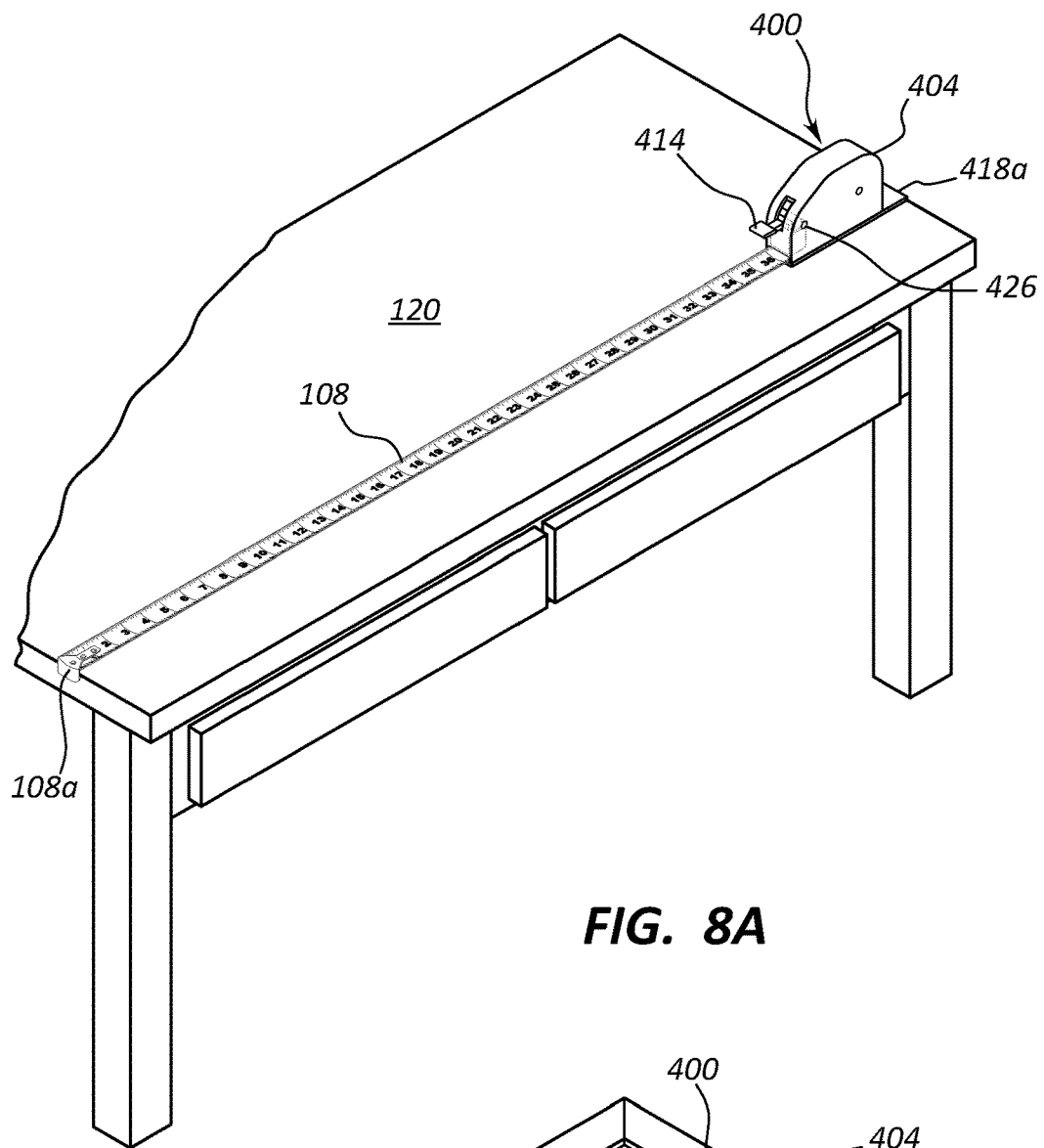
FIG. 8A is similar to FIG. 4A, but shown using the device of FIGS. 7A-7C to measure the desk length or width.
Figure 8B:
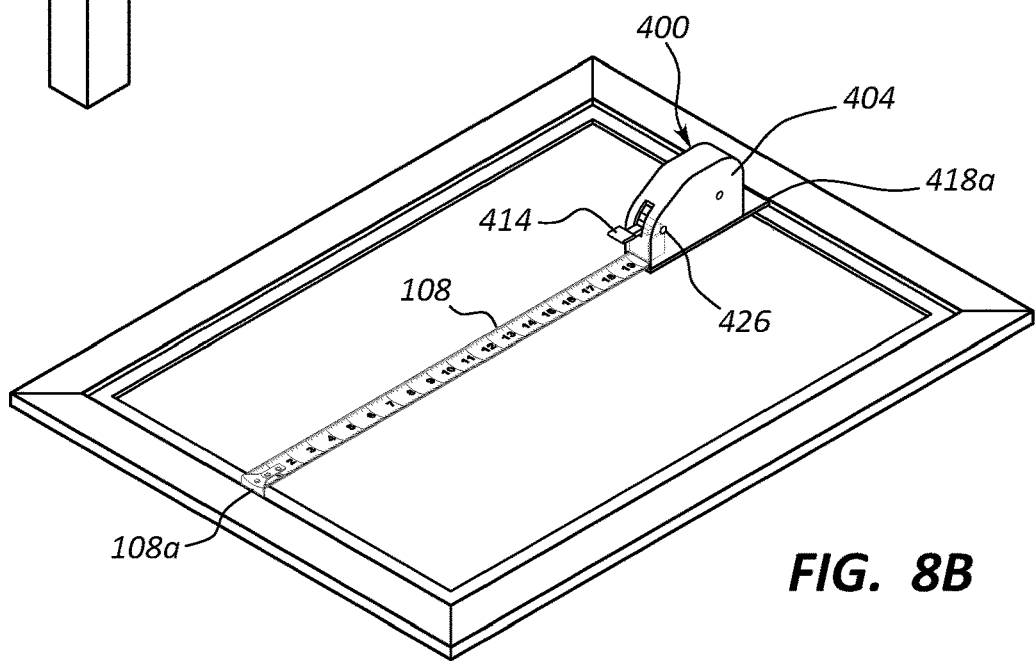
FIG. 8B is similar to FIG. 5B, but shown using the device of FIGS. 7A-7C to measure the inside dimension of the picture frame.

FIGS. 8A-8B are similar to FIGS. 4A-4B, but show measurement using device 400 of FIGS. 7A-7C.

Any of the devices according to the present invention (those embodiments described herein, or others) may be used in associated methods, which allow measurement between first and second points, without requiring a user to reference any measurement indicia typically included on a tape of a tape measure. For example, one end (leading edge 108a) of a tape 108 may be extended to the first point (e.g., one end of a desk, table top, inside of a cabinet, doorway, other opening, etc.) while aligning a straight edge (118a, 118b, 218a, 318a, 418a) of the device (e.g., 100, 200, 300, 400) with the second point (opposite end of the desk, table top, inside of cabinet, doorway, other opening etc.). With the device locked in place, the desired measurement is defined between the first end of the tape (e.g., leading edge 108) and the straight edge 118a, 118b, 218a, 318a, or 418a.

With the locking device locked to tape 108, the tape and locking device are moved to a board or other material or object to be cut, marked, or compared using the measurement that is "locked" into or "remembered" by the device and tape 108 locked together. With the end of the tape (leading edge 108a) at one end, and the straight edge at the other end designating the point at which the board is to be cut, marked, or compared, this may occur. The board or other material may then be cut, marked, compared or otherwise used with the measurement. This allows the user to translate the measurement taken from between the first and second points from where the measurement was taken (e.g., desk, table top, inside of cabinet, doorway, other opening etc.) to the board or other material, without requiring any reference to measurement indicia that may be on the tape. Of course, it will be appreciated that cutting or marking the board or other material is not necessarily required. For example, one may use the method to measure a desk or other object to be sure that it will fit through a doorway or other opening. Those of skill in the art will appreciate that such methods may similarly be used in a variety of other circumstances where measurement (or comparison of a measurement) is desired.

Figure 9:
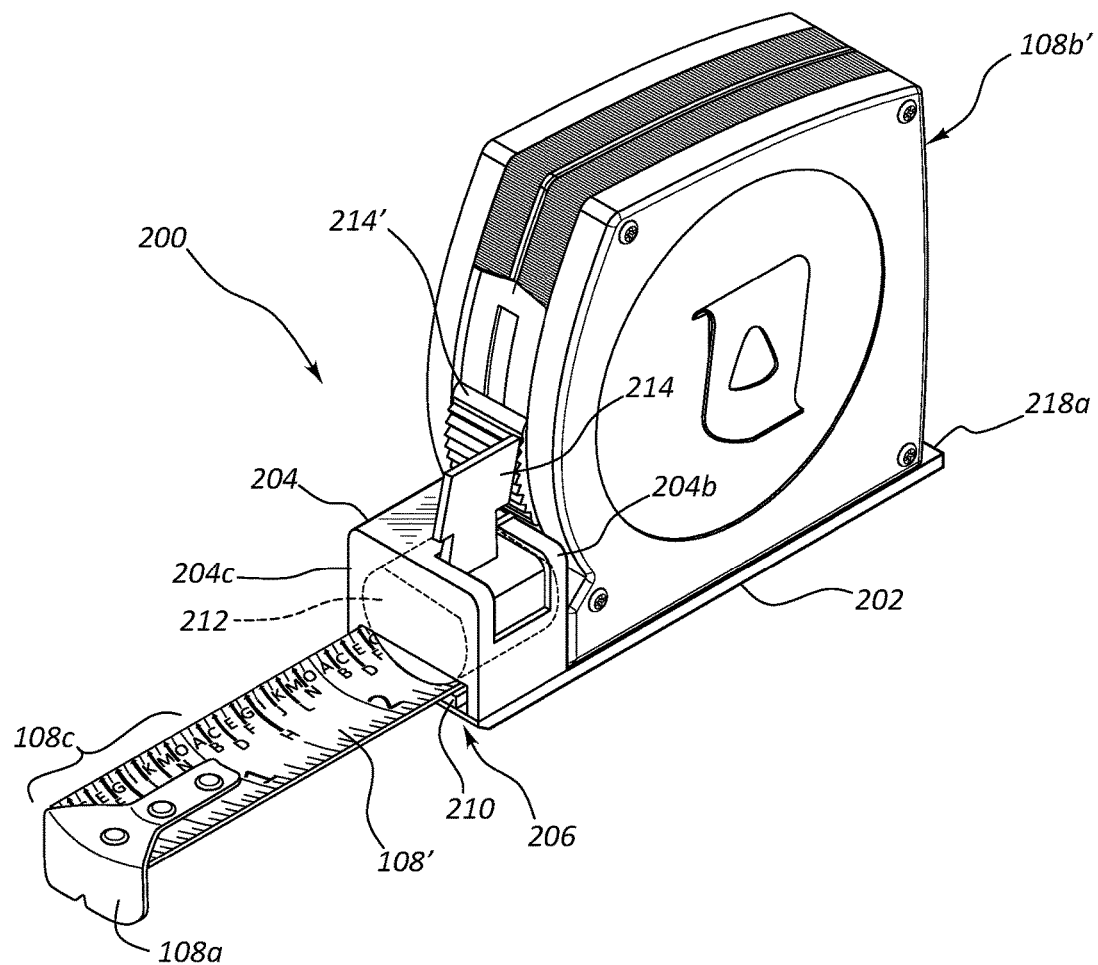
FIG. 9 is similar to FIG. 1, but shown with alternative tape indicia according to an embodiment of the present invention.
Figure 10B:
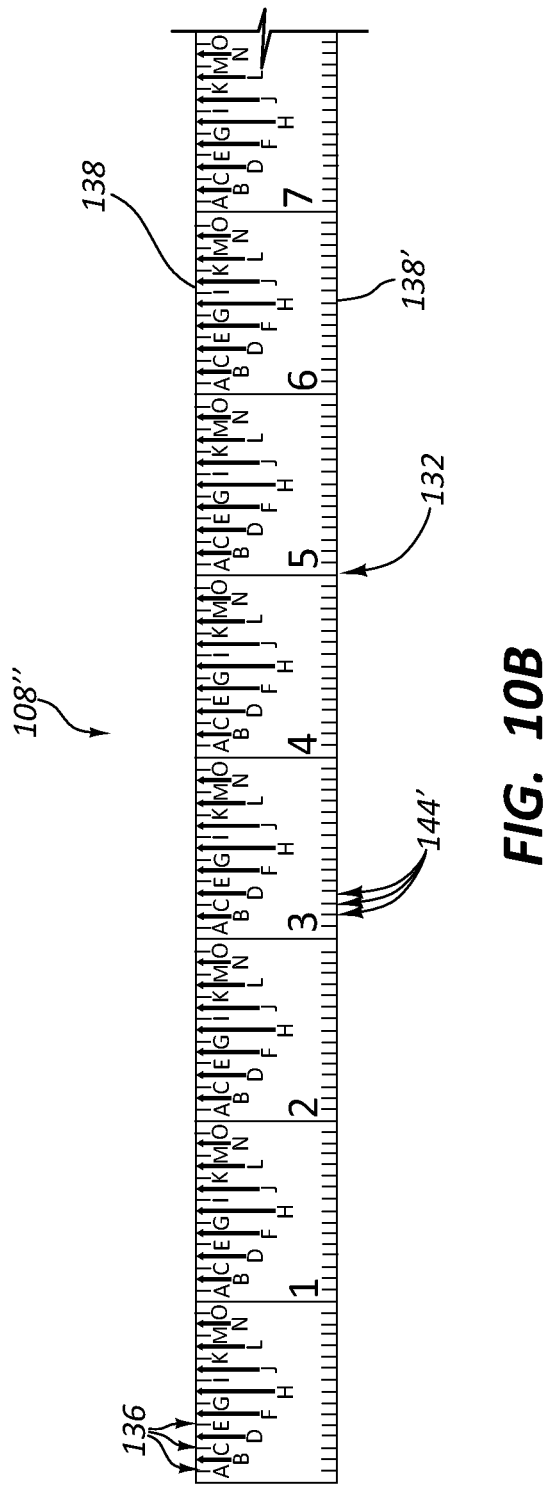
FIG. 10B shows a plan view of another tape, similar to that of FIG. 10A, but with different indicia, also according to the present invention.
Figure 11:
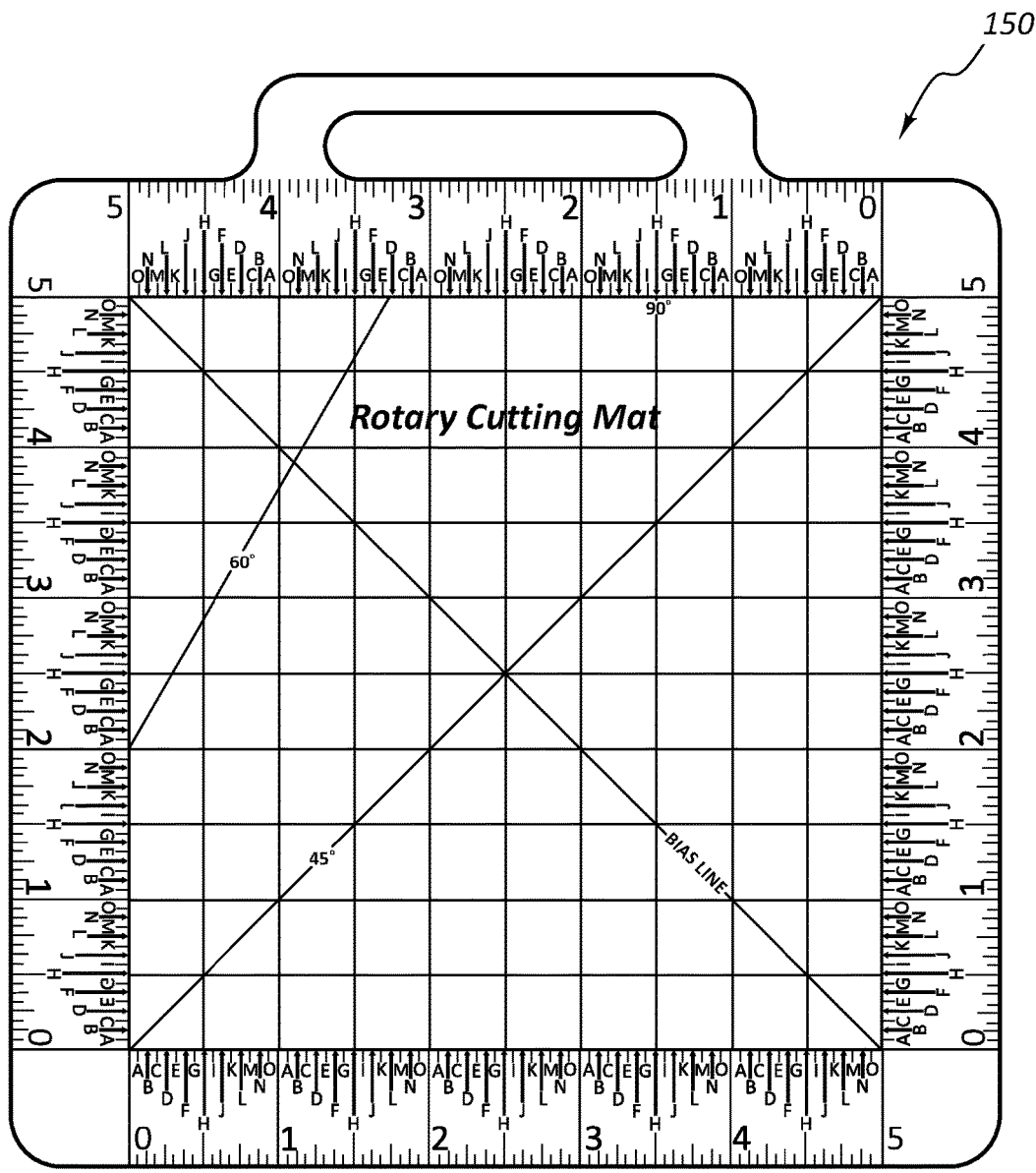
FIG. 11 shows how the measurement indicia, tape, or measurement device may be incorporated into various structures, e.g., a seamstress or craft cutting mat.

FIGS. 9-11 illustrate another aspect of the present invention, directed to improvements in the markings or indicia on a tape or similar measurement device. As noted above, many users find the fractional markings typically included on a tape measure frustrating and difficult to work with. FIG. 9 shows a tape measure device 108b' similar to that of FIG. 5, but in which the tape 108' is differently configured from tape 108. FIG. 10A shows the tape 108' alone (e.g., separate from the housing and other structures that may be associated with a tape measure). As will be appreciated by those of skill in the art, a tape measure need not even include any such housing at all, as those who are familiar with a tape measure typically used by a seamstress, or in taking clothing measurements. While the length of the tape 108' seen in FIG. 10A is limited to only about 8 inches due to the limitations of the illustration sheet, it will be appreciated that the tape may be of any desired length (e.g., 6 feet, 12 feet, 16 feet, 20 feet, 24 feet, 50 feet, 100 feet, or the like).

As seen in FIG. 10A, tape or other device 108' may include a substrate 130 (e.g., configured as a tape) on which markings or indicia may be disposed. FIG. 10A shows first indicia 132 which are shown as being numeric integral number measurement indicia, regularly, equally spaced on device 108' to mark inches (e.g., 1 inch, 2 inches, 3 inches, etc.) along substrate 130. Of course, in other embodiments, the length interval between adjacent first indicia 132 may be different (e.g., centimeters, or the like). In the illustrated embodiment, a vertical line 134 extending the full width of the tape 108' or substrate 130 is shown associated with each first indicia 132, marking the actual measurement. FIG. 10AA, shows a blow up of a portion of tape 108' of FIG. 10A, to more easily label some of the features.

As seen in FIGS. 10A and 10AA, in addition to first indicia 132, tape 108' also includes second indicia 136, e.g., positioned along a top edge 138 of tape 108'. Second indicia are not labeled numerically, but are labeled with letters (e.g., beginning with "A", and progressing as needed). Such second indicia are regularly spaced to mark fractions of inches whatever other units are integrated into first indicia 132). For example, in the illustrated embodiment, each adjacent second indicia ("A" to "B" are spaced one-sixteenth of an inch apart, so that each progressive letter marks an additional sixteenth of an inch from the previous first indicia 132. In the illustrated embodiment, second indicia 136 include letters "A" through "O", with each adjacent letter associated with a vertical line 140 or vertical arrow 142 spaced one-sixteenth of an inch apart.

Thus, "A" marks one-sixteenth of an inch beyond the previous first indicia numeral (e.g., the "A" after numeral "38" would represent or mark 38 1/16 inches). Similarly, "B" marks one-eighth of an inch beyond the previous first indicia numeral, "C" marks three-sixteenths of an inch beyond the previous first indicia numeral, "D" marks one-fourth of an inch beyond the previous first indicia numeral, "E" marks five-sixteenths of an inch beyond the previous first indicia numeral, "F" marks three-eighths of an inch beyond the previous first indicia numeral, "G" marks seven-sixteenths of an inch beyond the previous first indicia numeral, "H" marks one-half of an inch beyond the previous first indicia numeral, "I" marks nine-sixteenths of an inch beyond the previous first indicia numeral, "J" marks five-eighths of an inch beyond the previous first indicia numeral, "K" marks eleven-sixteenths of an inch beyond the previous first indicia numeral, "L" marks three-quarters of an inch beyond the previous first indicia numeral, "M" marks thirteen-sixteenths of an inch beyond the previous first indicia numeral, "N" marks seven-eighths of an inch beyond the previous first indicia numeral, and "O" marks fifteen-sixteenths of an inch beyond the previous first indicia numeral.

Although described and illustrated with sixteenths, it will be appreciated that a similar pattern could be used for any desired fraction (fourths, fifths, eights, tenths, or the like), with a progressive letter associated with each, as desired. Furthermore, while illustrated and described with progressive letters for second indicia, it will be appreciated that other easily remembered and worked with indicia might alternatively be used (e.g., colors, shapes, or perhaps even numbers), although the use of letters has been found to be particularly effective. Such alternatives are within the scope of the present invention.

As shown in FIG. 10A, the progression of letter measurement indicia 136 (e.g., letters "A" to "O") is repeated between each pair of adjacent numeric measurement first indicia 132. In the illustrated embodiment, there are vertical lines 140 alternating with vertical arrows for each letter second indicia 136. For example, letters "A", "C", "E", "G", "I", "K", "M", and "O" each include a vertical line 140 associated therewith. In addition each of these letters are shown positioned on tape 108' at the same height between top edge 138 and bottom edge 138'. Letters "B", "D", "F", "H", "J", "L", and "N" each include a vertical arrow 142 associated therewith. Each of these letters are shown positioned on tape 108' at the same closer to bottom edge 138' than the letters including vertical lines 140. Further, there is variation in placement of the letters including vertical arrows, where the placement progressively drops lower (towards bottom edge 138) as the letters approach the midpoint, letter "H". After passing the midpoint at letter "H", the placement progressively moves upward again (towards top edge 138), creating symmetry as one advances from one numeral of the first indicia to the next numeral of the first indicia. As shown, the length of the vertical arrows may also become progressively longer as the mid-portion (at "H") between adjacent numeric measurement indicia 132 is reached. Such staggering and placement of the arrows 142 and letters of second indicia 136 aids in facilitating easier recognition of the particular appropriate measurement (e.g., 38 F, or whatever it may be).

Furthermore, the vertical arrows may be color coded, so that each vertical arrow associated with a given letter is of a particular color that may differ from the colors of other arrows, which color coding may be repeated as the letters are repeated between further adjacent pairs of numeric first indicia. For example, all the "B" arrows may be purple, all the "D" arrows may be green, all the "F" arrows may be red, all the "H" arrows may be blue, all the "J" arrows may be purple (e.g., same as "A"), all the "L" arrows may be brown, and all the "N" arrows may be blue-gray. Of course, any desired color coding scheme could be used.

As seen in FIGS. 10A and 10AA, device 108' may further include third indicia 144, e.g., positioned along the bottom edge 138'. As shown, the second indicia (e.g., particularly vertical lines 140 and vertical arrows 142) may be positioned at one edge (e.g., top edge 138) of device 108', with third indicia vertical lines) positioned along the opposite edge (e.g., bottom edge 138') of device 108'. In the illustrated embodiment of FIGS. 10A and 10AA, each of the third indicia markers are spaced one-sixteenth of an inch from one another, marking one-sixteenth fractional intervals between numeric first indicia 132. The third indicia thus are vertically aligned with corresponding lettered second indicia along the opposite edge. As illustrated, the vertical line length of each third indicia may vary, with those corresponding to sixteenth inch intervals being shortest (the same length as vertical lines 140), those corresponding to eighth inch intervals being somewhat longer (i.e., these correspond to "B", "F", "J", and "N"), those corresponding to quarter inch intervals being somewhat longer still (i.e., these correspond to "D", and "L"), and the one corresponding to the mid-point, half-inch interval being longest (i.e., which corresponds to "H").

The same color coding applied to lettered vertical arrows 142 may also be applied to the vertical lines of third indicia 144. For example, vertical line third indicia 144 aligned with "B" may also be purple, vertical line third indicia 144 aligned with "D" may be green, vertical line third indicia 144 aligned with "F" may be red, vertical line third indicia 144 aligned with "H" may be blue, vertical line third indicia 144 aligned with "J" may be purple, vertical line third indicia 144 aligned with "L" may be brown, and vertical line third indicia 144 aligned with "N" may be gray-blue. The other vertical line third indicia (and vertical line second indicia 140) may simply be a base color (e.g., all black, all red, or the like—different from the "color coded" portions).

FIG. 10B illustrates another embodiment of a tape 108'', which is shown as similar to tape 108' of FIGS. 10A and 10AA, but in which third indicia 144' are more simply configured, without variation in vertical line length. Such a simplified version may or may not include the color coding within the third indicia 144' as described above.

Such improved tape markings may be incorporated into any desired structure including length measurements, such as a tape measure (e.g., with or without a housing, e.g., that retracts and coils the tape). FIG. 9 shows such the tape of FIGS. 10A-10AA incorporated into a measurement device such as that of FIG. 5. It will be appreciated that such a tape could be incorporated into any tape measure or other measurement device.

In addition, such a measurement device could be incorporated into a table saw, workbench, cutting mat, sewing machine, or other structure where measurement markings along an edge or surface may typically be helpful. FIG. 11 shows an exemplary cutting mat 150. While second indicia 136 are shown towards the inside or r edge of cutting mat 150, and third indicia 144 are shown towards the outer edge of the cutting mat, it will be appreciated that the positions could be reversed (e.g., with second lettered indicia 136 at the outer edge, and third indicia 144 at the inner edge, if present at all). Although FIG. 11 shows the cutting mat in relatively small dimensions as indicated by device 108', such is due to the limitations of paper size in the drawings. It will be appreciated that any size cutting mat or other structure may be accommodated, with typical sizes being much larger in dimensions.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. A device for measurement, comprising:
   a substrate;
   first indicia on the substrate, the first indicia comprising numeric measurement indicia regularly spaced to mark inches or other units of length along the substrate; and
   second indicia on the substrate, the second indicia comprising letter measurement indicia regularly spaced to mark fractions of inches or fractions of other units of length along the substrate between adjacent numeric measurement indicia;
   wherein the letter measurement indicia include letters extending from A to O, each letter corresponding to a fractional sixteenth of an inch between adjacent numeric measurement indicia, wherein the letter measurement indicia are repeated between each adjacent set of numeric measurement indicia.

2. The device as recited in claim 1, wherein a vertical line is associated with each letter measurement indicia.

3. The device as recited in claim 1, further comprising third indicia on the substrate, wherein the second indicia are disposed at one edge of the device for measurement, and the third indicia are disposed at an opposite edge of the device for measurement.

4. The device as recited in claim 3, wherein the second indicia are disposed on a top edge of the device and the third indicia are disposed on a bottom edge of the device.

5. The device as recited in claim 1, wherein the device for measurement is a tape measure.

6. The device as recited in claim 1, wherein the device for measurement is incorporated into at least one of a cutting mat, a sewing machine, a table saw or a work bench.

7. A device for measurement, comprising:
   a substrate;
   first indicia on the substrate, the first indicia comprising numeric measurement indicia regularly spaced to mark inches or other units of length along the substrate; and
   second indicia on the substrate, the second indicia comprising letter measurement indicia regularly spaced to mark fractions of inches or fractions of other units of length along the substrate between adjacent numeric measurement indicia;
   wherein a vertical line is associated with each letter measurement indicia;
   wherein alternating vertical lines associated with the letter measurement indicia comprise vertical arrows.

8. The device as recited in claim 7, wherein the letter measurement indicia include letters extending from A to O, each letter corresponding to a fractional sixteenth of an inch between adjacent numeric measurement indicia.

9. The device as recited in claim 8, wherein the letter measurement indicia are repeated between each adjacent set of numeric measurement indicia.

10. The device as recited in claim 7, wherein the vertical arrows are color coded.

11. The device as recited in claim 10, wherein the vertical arrows are progressively longer as a mid-portion between adjacent numeric measurement indicia is reached.

12. The device as recited in claim 7, wherein:
   the letter measurement indicia include letters extending from A to O, each letter corresponding to a fractional sixteenth of an inch between adjacent numeric measurement indicia;
   wherein the alternating vertical lines associated with the letter measurement indicia comprising vertical arrows are color coded;
   wherein the letters A, C, E, G, I, K, M and O have vertical lines associated with them, and letters B, D, F, H, J, L, and N have color coded vertical arrows associated with them.

13. A tape measure device comprising:
   a base member;
   a housing supported on the base member including a slot for slidably receiving a tape of the tape measure insertable through the slot of the housing;
   an elastomeric gripping layer positioned in the housing, positioned to contact a face of the tape when the tape is locked in a given position during use;
   a movable pressure locking wedge positioned within the housing so that the tape is pinchable between the pressure locking wedge and another surface;

a handle operable to move the pressure locking wedge which allows selective locking of the tape between the pressure locking wedge and the other surface upon actuation of the handle; and a tape inserted or insertable through the slot of the housing, wherein the tape includes:

first indicia on the tape, the first indicia comprising numeric measurement indicia regularly spaced to mark inches or other units of length along the tape; and second indicia on the tape, the second indicia comprising letter measurement indicia regularly spaced to mark fractions of inches or fractions of other units of length along the tape between adjacent numeric measurement indicia.

14. The device as recited in claim 13, wherein the letter measurement indicia include letters extending from A to O, each letter corresponding to a fractional sixteenth of an inch between adjacent numeric measurement indicia.

15. The device as recited in claim 14, wherein the letter measurement indicia are repeated between each adjacent set of numeric measurement indicia.

16. The device as recited in claim 13, wherein a vertical line is associated with each letter measurement indicia.

17. The device as recited in claim 16, wherein alternating vertical lines associated with the letter measurement indicia comprise vertical arrows.

18. The device as recited in claim 17, wherein the vertical arrows are color coded.

19. The device as recited in claim 18, wherein the vertical arrows are progressively longer as a mid-portion between adjacent numeric measurement indicia is reached.

20. The device as recited in claim 13, further comprising third indicia on the substrate, wherein the second indicia are disposed at one edge of the device for measurement, and the third indicia are disposed at an opposite edge of the device for measurement.

* * * * *